United States Patent Office 3,554,732
Patented Jan. 12, 1971

3,554,732
WEED KILLERS AND USE THEREOF
Michael Anthony Priola, Scarsdale, N.Y., assignor to Geigy Chemical Corporation, Ardsley, N.Y., a corporation of New York
No Drawing. Continuation-in-part of application Ser. No. 492,931, Oct. 4, 1965. This application Dec. 22, 1967, Ser. No. 692,693
Int. Cl. A01n 9/22, 9/24
U.S. Cl. 71—93         3 Claims

ABSTRACT OF THE DISCLOSURE

Compositions containing diamino-s-triazines, 2,4–D, pentachlorophenol and herbicidal oil are long-term weed killers. A single application of these compositions effectively controls weeds through an entire growing season.

DETAILED DISCLOSURE

This application is a continuation-in-part of my copending application Ser. No. 492,931, filed Oct. 4, 1965, now abandoned.

This invention is concerned with new compositions for killing weeds and with methods for their use. More particularly, it relates to synergistic herbicidal compositions containing herbicidal oil, pentachlorophenol, 2,4-diphenoxyacetic acid compounds and diamino-s-triazines.

The term "weeds" as used herein includes the various broadleaf varieties of plants and also the grasses.

Th diamino-s-triazines are those described in U.S. Pat. No. 2,909,420 as having, even in low concentrations, an inhibitory effect on the growth of plants. These compounds have the general formula

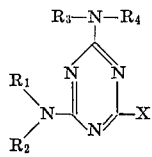

wherein $R_1$, $R_2$, $R_3$ and $R_4$ each represents hydrogen or a lower alkyl, lower alkenyl, lower hydroxyalkyl, aralkyl or cycloalkyl radical, and each of the pairs of radicals $R_1/R_2$ and $R_3/R_4$ together with the corresponding nitrogen atom represents a five to six-membered alkylenimino radical or the morpholino radical, and X represents hydrogen or a lower alkyl, lower alkoxy, lower alkylmercapto, lower alkenyloxy, lower alkenylmercapto, lower nitroalkoxy, lower haloalkoxy, lower alkoxyalkoxy or lower hydroxyalkoxy radical.

Compounds of the general formula defined above are obtained easily, for example, by subsequent reaction of cyanuric chloride with two mols of ammonia, primary or secondary amines and with aliphatic alcohols or mercaptans. Compounds wherein X represents a lower alkyl radical or hydrogen are the acylo-guanamines obtainable by heating salts of biguanide or substituted biguanides with lower aliphatic carboxylic acids. Compounds wherein X represents hydrogen can also be prepared e.g. by reaction of cyanuric chloride with two mols of ammonia or a primary or secondary amine, followed by reduction of the diaminochloro-s-triazines obtained.

Particular diamino-s-triazine compounds include within the scope of this invention are the following:

2,4-bis(isopropylamino)-6-methylthio-s-triazine
2,4-bis(isopropylamino)-6-methoxy-s-triazine
2-ethylamino-4-isopropylamino-6-methoxy-s-triazine
2,4-bis(ethylamino)-6-methoxy-s-triazine
2,4-bis(ethylamino)-6-methylthio-s-triazine
2-ethylamino-4-isopropylamino-6-methylthio-s-triazine The mercapto-s-triazines, particularly 2,4-bis(isopropylamino)-6-methylthio-s-triazine, are especially effective and are generally preferred for compositions of this invention. However, all triazines coming within the scope of the formula may be used. In addition, mixtures of these triazines may be employed in the practice of this invention.

The 2,4-dichlorophenoxyacetic acid compound used in the present compositions is most frequently in the form of the oil-soluble amine salt which dissolves in the herbicidal oil. However, one may use the ester of the acid, in the form of an emulsion. Likewise, the alkali metal salts (e.g., the sodium salt of 2,4-dichlorophenoxyacetic acid in aqueous suspension, or the acid itself in a suitable organic solvents, may be employed. All of these forms are included in the term "2,4–D" for present purposes.

The herbicidal oils used in the compositions of this invention are well-known in the art and are described in great detail with full specifications in "Herbicide Manual," Agriculture Handbook No. 269, by R. S. Dunham, published by Agriculture Research Service, U.S. Department of Agriculture, Washington, D.C., issued March 1965, pages 12–13. Suitable herbicidal oils in the present compositions include aromatic oils such as solvent naphthas or petroleum naphthas, aliphatic oils such as mineral spirits, diesel oils, fuel oils, kerosene and the like. One may also use emulsifiable oils which contain a surfactant capable of causing emulsification of the oil when it is mixed with water. While these oils may have some initial weed-killing properties, their action, particularly on perennials, is usually temporary and even then, is ineffective on many of the common weeds. Many of the weed killers currently in use are merely what are commonly referred to as knockdown agents or "burners" which give an initial kill of the weeds but, after a short period of time, the weeds come back substantially as healthily and profusely as before. For many purposes, e.g., the control of weeds in railway roadbeds or in industrial sites, such temporary knockdown is obviously unsatisfactory. For these purposes it would be most desirable to have a herbicidal composition which could be applied once and would prevent the growth of weeds for the entire growing season. Such compositions have now been provided by this invention.

The various constituents of these new herbicidal compositions all have useful herbicidal properties by themselves, but they fail to provide the long term control of weeds necessary for railway roadbeds and industrial sites. Likewise, combinations of weed killers such as 2.4-D in herbicidal oil or a diamino-s-triazine (e.g. 2,4-bis(isopropylamino)-6-methylthio-s-triazine) are effective as knockdown agent but do not provide long term control.

According to the present invention, control of weed growth for an entire season is obtained by applying to the weeds a composition comprising one or more of the diamino-s-triazine derivatives described and claimed in U.S. Pat. No. 2,909,420, a herbicidal oil, pentachlorophenol and 2,4–D, the latter preferably in the form of the amine or alkali metal salts or esters thereof. Application of this weed killer composition is carried out by bringing the composition into contact with at least a part of the weed in an amount sufficient to kill and prevent weed growth.

A most effective weed killer composition comprises:

| | Lbs. |
|---|---|
| Herbicidal oil | 220 |
| Pentachlorophenol | 2 |
| 2,4–D amine | 2 |
| 2,4-bis(isopropylamino)-6-methylthio-s-triazine | 5 |

This amount of composition is sufficient to treat one acre by machine spraying. It was sprayed at this rate on a railway roadbed which was overgrown with heavy vegetation which was primarily annual grasses, sandburr, bindweed, sunflowers, foxtail, joint grass, firebush and ragweed. The composition was applied at 10 p.s.i. at 8 miles per hour. Examination of the treated roadbed after 3 weeks showed excellent kill of all of the weeds, and further examination 2 months after application showed that the composition had completely killed 99+% of the vegetation and had prevented sprouting of late germinating grasses including fall penicum (witch grass), witch's broom and crabgrass, all of which had come up in adjacent test plots used as checks and also in those adjacent plots similarly treated with other so-called weed killer compositions.

Similar excellent results are obtained when others of the diamino-s-triazine derivatives described above are substituted for the specific triazine of the above example. Mixtures of these triazine derivatives may be used, if desired on occasion to give better over-all effectiveness.

A single application of the compositions of this invention generally provides effective control of weeds for an entire growing season. Not only are the weeds initially killed by these herbicidal compositions, but also the growth of late-germinating weeds is prevented or substantially slowed.

The amounts of the ingredients of the present compositions may be varied widely. Customarily, the compounds are stated on the basis of pounds or gallons used for the treatment of an acre. The triazines are effective at as little as 2 pounds per acre and while this amount may be increased to as much as 50 pounds per acre, the added quantity is not required for effective weed-kill. From about 2 to about 10 pounds per acre is a preferred range. The herbicidal oil may be present in various amounts without materially affecting the results, but about 25 to about 40 gallons an acre is a convenient range. Likewise, the amounts of pentachlorophenol and the 2,4–D are not critical but it is preferable that each of these ingredients be used in amounts ranging from about 2 to about 10 pounds per acre. Generally the practice is to use the minimum amounts of ingredients consistent with obtaining the desired results. It is especially convenient to use equal amounts by weight of 2,4–D and pentachlorophenol and an amount of triazine equal to the total weight of the 2,4–D and pentachlorophenol.

The compositions of this invention may also include any one or more of the additives commonly used in this field such as the various wetting or dispersing agents, solvents, protective colloids, spreading agents, adhesives and the like, without affecting the weed-killing activity of the compositions.

Suitable other changes and variations may be adopted without departing from the spirit and scope of the invention as defined in the claims.

I claim:
1. A method of killing weeds which comprises bringing into contact with at least a part of the weed in an amount sufficient to kill the weed, a composition comprising a herbicidal oil, 2,4-dichlorophenoxyacetic acid, pentachlorophenol and 2,4-bis(isopropylamino)-6-methylthio-s-triazine.

2. The method of claim 1 in which the composition is used in sufficient amount to impart at least 2 pounds each per acre of 2,4-dichlorophenoxyacetic acid, pentachlorophenol, and 2,4-bis(isopropylamino)-6-methylthio-s-triazine.

3. A weed killer composition comprising herbicidally effective amounts of a herbicidal oil, 2,4-dichlorophenoxyacetic acid, pentachlorophenol and 2,4-bis(isopropylamino)-6-methylthio-s-triazine.

References Cited
UNITED STATES PATENTS

| 3,075,834 | 1/1963 | Lehureau | 71—93 |
| 3,272,613 | 9/1966 | Young | 71—127 |

FOREIGN PATENTS

| 1,115,517 | 10/1961 | Germany | 71—93 |
| 960,649 | 6/1964 | Great Britain | 71—93 |
| 1,129,743 | 10/1968 | Great Britain | 71—93 |

JAMES O. THOMAS, JR., Primary Examiner

U.S. Cl. X.R.

71—117, 122